US006298368B1

United States Patent
Miller, Jr.

(10) Patent No.: US 6,298,368 B1
(45) Date of Patent: Oct. 2, 2001

(54) METHOD AND APPARATUS FOR EFFICIENT CALCULATION OF AN APPROXIMATE SQUARE OF A FIXED-PRECISION NUMBER

(75) Inventor: Robert H Miller, Jr., Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/299,196

(22) Filed: Apr. 23, 1999

(51) Int. Cl.[7] .................................................. G06F 7/38
(52) U.S. Cl. ................................. 708/606; 708/550
(58) Field of Search .......................... 708/606, 627–628, 708/550

(56) References Cited

U.S. PATENT DOCUMENTS 5,629,885 * 5/1997 Pirson et al. ......................... 708/606
5,957,999 * 9/1999 Davis ................................... 708/606

* cited by examiner

*Primary Examiner*—Tan V. Mai
(74) *Attorney, Agent, or Firm*—Alexander J. Neudeck

(57) ABSTRACT

A bit position, M, that determines the accuracy and efficiency of the approximation is selected from an N bit binary number. The multiplicand is generated by removing the Mth bit from the binary number, shifting the bits of lower order than the Mth bit up on position, then filling the lowest order bit with a zero. The multiplier is generated by removing the Mth bit, and all lower order bits from the binary number. Booth's algorithm is then used to multiply the multiplicand and the multiplier except that the Mth bit is used instead of an assumed zero during the first step of the multiplication. In hardware, a partial Booth-encoded multiplier is used to produce and approximate square of a binary number. For an N bit number, and a selected bit in the Mth position, the partial Booth-encoded multiplier has N columns, and N–M rows and N–M booth encoders. The inputs to the columns are wired so that the multiplicand has the Mth bit from the binary number removed and the bits of lower order than the Mth bit up are shifted up position, the lowest order bit being filled with a zero. The inputs to the Booth encoders are the N–M highest order bits of the binary number. The Mth bit of the binary number is input to the first Booth encoder instead of an assumed zero.

18 Claims, 2 Drawing Sheets

METHOD AND APPARATUS FOR EFFICIENT CALCULATION OF AN APPROXIMATE SQUARE OF A FIXED-PRECISION NUMBER

FIELD OF THE INVENTION

This invention relates generally to computer arithmetic. More particularly, this invention relates to a circuit and method for calculating an approximation of the square of a binary number.

BACKGROUND OF THE INVENTION

The square of a number is desired by many applications in computers, signal processing, computer graphics, and computer arithmetic. In many of these applications, calculating an approximation of the square of a number meets the needs of the application. For example, take a number sampled by a 16-bit analog to digital converter that represents a value between zero and one. This could be represented as a 16-bit number with the radix point to the left of the most significant bit. Also, since this number has only sixteen bits of precision, then there are at most sixteen significant binary digits. When this number is squared, the result would be thirty-two bits long with the radix point still to the left of the most significant bit. However, because the result of the computation can be no more accurate than the least-accurate number in the data, at most sixteen of these bits are significant. The lower order sixteen bits should be rounded off. Because the lower order sixteen bits should be removed to round off the result to an appropriate number of significant binary digits, an approximation of the square of this number that produces the correct sixteen higher order bits can be a sufficient result.

Accordingly, a method and apparatus that produces an approximate square of a number in less time, and takes less area on an integrated circuit than calculating an exact square has broad need and application in the art.

SUMMARY OF THE INVENTION

A preferred embodiment of the invention can provide an approximate square of a number using about one-half the area on an integrated circuit, about one-half the power, and only taking about one half-the time compared to calculating an exact square using a full multiplier. The invention is scalable to accommodate inputs with different numbers of bits and can be implemented using existing circuits and techniques.

An embodiment of the invention may be implemented as a partial Booth-encoded multiplier. This partial Booth-encoded multiplier has M+1 fewer rows of Booth encoding and shifter-adder rows than a full Booth-encoded multiplier. The missing rows correspond to the M+1 least significant bits. A multiplier is generated by truncating the number to be squared by removing these M+1 least significant bits. This multiplier is applied to the rows of the partial Booth-encoded multiplier. In addition, the least significant bit of the multiplier (the Mth numbered bit of the original number when counting starts with the $0^{th}$ bit) is applied to the −1 bit input of the first Booth encoder. A multiplicand is generated by removing the Mth numbered bit of the original number, shifting the least significant M bits up by one bit, and placing a zero in the least significant bit position. This multiplicand is applied to the columns of the partial-Booth encoded multiplier to be shifted, added, and subtracted according to Booth's algorithm. The output of the partial Booth-encoded multiplier array is an approximate square of the number.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

A Booth-encoded multiplier is a hardware implementation of Booth's algorithm for multiplying two binary numbers. Booth's algorithm is based on the fact that a string of 0s in the multiplier requires no addition, just shifting, and a string of 1s running from bit p to bit q can be treated as $2^{q+1}-2^p$. Note the counting of bits starts with bit 0 as the least significant bit corresponding to $2^0=1$. For example, consider the multiplier $X=00011110_2$. In this case, p equals 1 and q equals 4. Accordingly, $2^{q+1}-2^p=2^5-2^1=32-2=30$, is the value of X. For this multiplier, multiplication with Booth's algorithm requires only two operations that are not shifts: one subtraction and one addition.

Booth's algorithm is detailed in "A Signed Binary Multiplication Algorithm," *Quarterly Journal of Mechanics and Applied Mathematics*, Vol. 4, Pt. 2, 1951, pp. 236–240 by A. D. Booth which is hereby incorporated herein by reference. To illustrate a radix-1 implementation of Booth's algorithm, let $x_i$ be the ith bit of an n-bit multiplier, X. Bits are numbered such that bit $x_{n-1}$ is the most significant bit, and $x_o$ is the least significant bit. Also let the multiplicand be Y. All shifts are left with respect to the partial product. Starting with i=0 and continuing through i=n−1, the following actions are taken: If $x_i=0$ and $x_{i-1}=0$, then shift Y. If $x_i=0$ and $x_i-1=1$, add Y to partial product, then shift Y. If $x_i=1$ and $x_{i-1}=0$, subtract Y from partial product, then shift Y. If $x_i=1$ and $x_{i-1}=1$, then shift Y. A first bit $x_{-1}=0$ is assumed.

This description is of a radix-1 implementation of Booth's algorithm. Higher radix implementations of Booth's algorithm, such as radix-2 and radix-3, could be used by the present invention. A radix-2 implementation of Booth's algorithm still has an assumed bit of $x_{-1}=0$, but its actions are governed by the following table:

| $x_{i+1}$ | $x_i$ | $x_{i-1}$ | Action |
|---|---|---|---|
| 0 | 0 | 0 | shift Y two bits |
| 0 | 0 | 1 | Add Y, then shift Y two bits |
| 0 | 1 | 0 | Add Y, then shift Y two bits |
| 0 | 1 | 1 | Add 2Y, then shift Y two bits |
| 1 | 0 | 0 | subtract 2Y, then shift Y two bits |
| 1 | 0 | 1 | subtract Y, then shift Y two bits |
| 1 | 1 | 0 | subtract Y, then shift Y two bits |
| 1 | 1 | 1 | shift Y two bits |

Note that since a radix-2 implementation of Booth's algorithm considers two new bits for each action (plus one bit for the previous action), a radix-2 implementation takes approximately half as many actions as a radix-1 implementation. This translates into about half as much area, and about twice the speed, when implemented in hardware.

Figure 1:
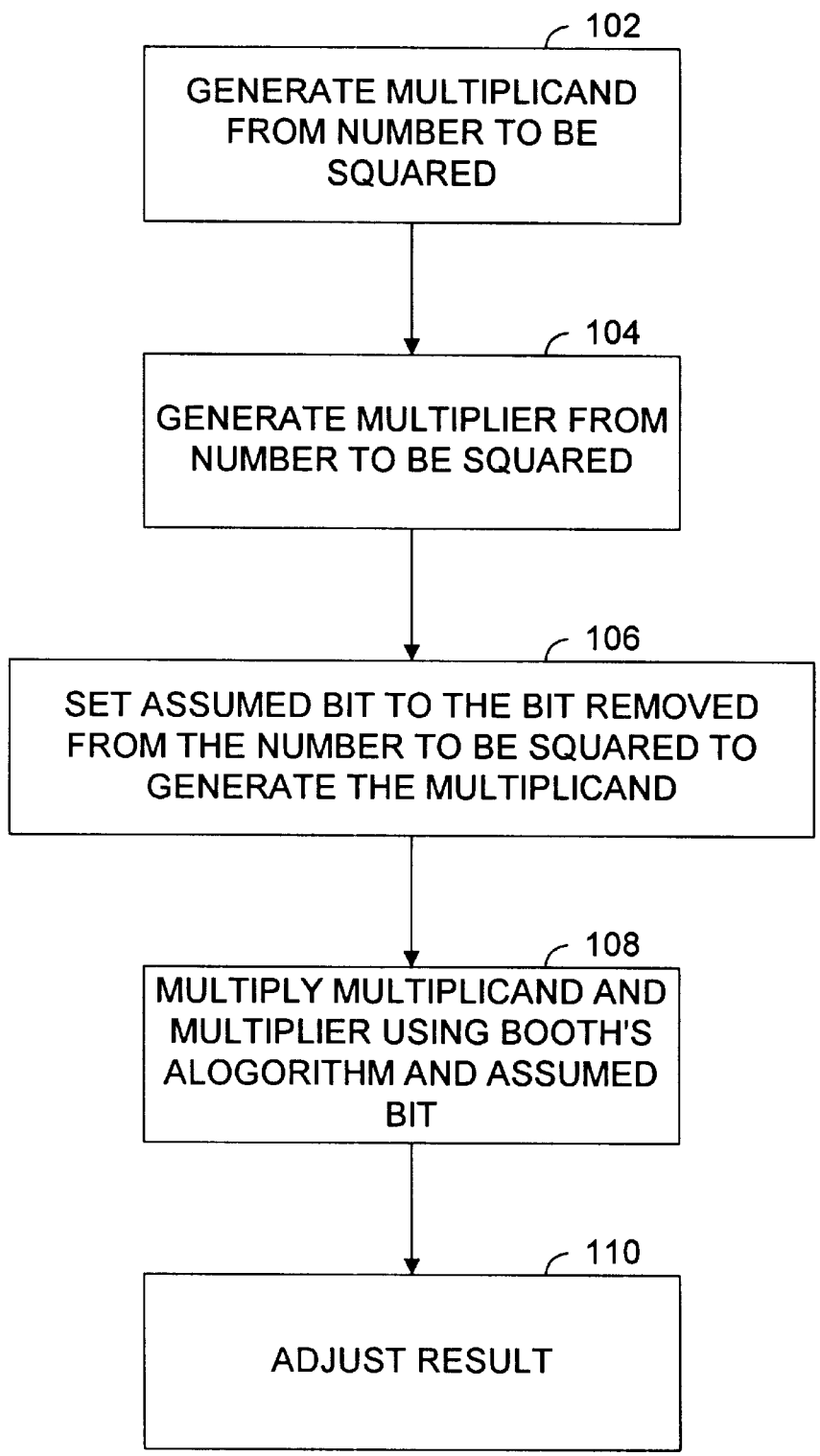
FIG. 1 is a flowchart that illustrates the steps to generate an approximate square of a number.

FIG. 1 is a flowchart that illustrates the step to generate an approximate square of a number. In a step 102, a multiplicand is generated from the number to be squared. To generate that multiplicand, a bit is removed from the number to be squared and then the bits that are less significant than the removed bit are each left shifted with the least significant bit being set to a zero. This is equivalent to setting the removed bit to zero, then multiplying the less significant bits by two. Multiplying the less significant bits by two is also equivalent to adding these less significant bits to themselves. To illustrate this process, let X be the the number to b e squared. Let $X_i$ mean the i-th bit of X. Also let N be the number of bits in X. Accordingly, X can be expressed as:

$$X=\{X_{N-1}, X_{N-2}, \ldots, X_M, X_{M-1}, \ldots, X_0\}_2.$$

Where M is the number of th e bit to be removed. Once the process of generating the multiplicand is complete, the multiplicand, C, can be expressed as:

$$C=\{X_{N-1}, X_{N-2}, \ldots, X_{M+1}, X_{M-1}, \ldots, X_0, 0\}_2.$$

In a step 104, a multiplier is generated from the number to be squared. To generate that multiplier, the least significant M+1 bits are removed from the number to be squared. Once the process of generating the multiplier is complete, the multiplier, D, can be expressed as:

$$D=\{X_{N-1}, X_{N-2}, \ldots, X_{M+1}\}_2.$$

In a step 106, the assumed bit of Booth's algorithm is set to the bit removed from the multiplicand. When the process of setting the assumed bit is complete, the assumed bit, A, can be expressed as:

$$A=\{X_M\}_2.$$

In a step 108, the generated multiplicand and the generated multiplier are multiplied using Booth's algorithm and the assumed bit, A.

Finally, in a step 110, the result is adjusted. Typically, this would involve shifting the result left or right to compensate for the removal of bits from the multiplier and the position of the radix point in the number to be squared. For example, if M was chosen to be 3 then the result could be adjusted by shifting it left 3 bit positions.

Note that since the multiplier consists of only N–M bits, fewer actions are taken during the operation of Booth's algorithm than would be taken if an exact square were calculated. Also note that since Booth's algorithm assumes an initial bit of zero, setting that initial bit to $X_M$ does not increase the number of actions taken during the operation of Booth's algorithm.

Figure 2:
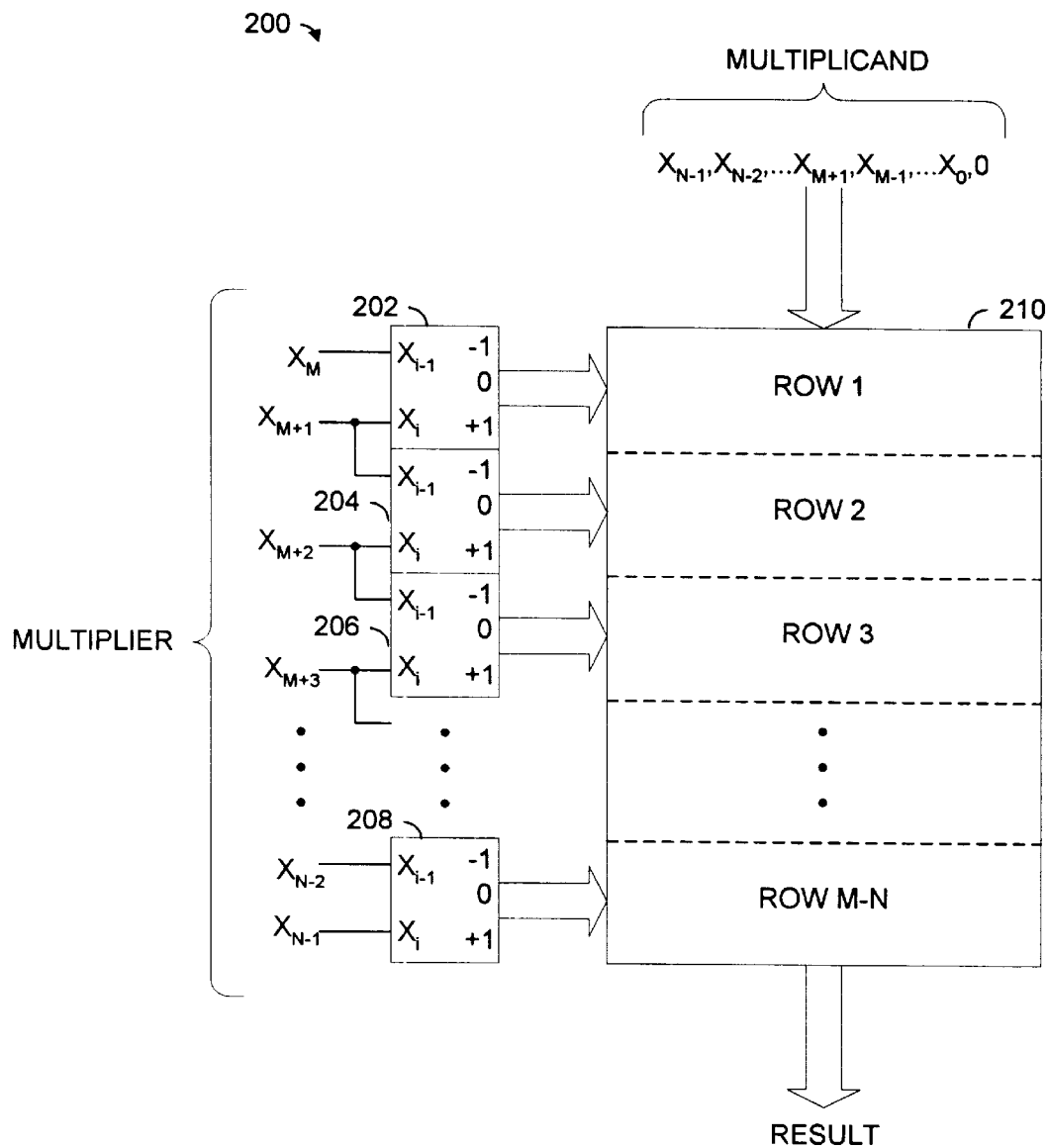
FIG. 2 is a diagram of a partial Booth-encoded multiplier array with the multiplier and multiplicand to generate an approximate square.

FIG. 2 is a diagram of a partial Booth-encoded multiplier 200 with the multiplier and multiplicand to generate an approximate square. Each row of the partial Booth-encoded multiplier 200 corresponds to an action taken during the operation of Booth's algorithm. Accordingly, the fact that fewer actions are taken during the generation of an approximate square translate directly to less space, less cost, and faster operation when the approximate square generation is done in hardware, and in particular on an integrated circuit.

In FIG. 2, Booth multiplier array 210 has N columns and N–M rows. A generated multiplicand, $\{X_{N-1}, X_{N-2}, \ldots, X_{M+1}, X_{M-1}, \ldots X_0, 0\}_2$, is applied to the columns of the Booth multiplier array. Note that this generated multiplicand can be created merely by connecting the inputs to the columns of the Booth multiplier array appropriately. No extra hardware or circuitry is necessary.

A generated multiplier $\{X_{N-1}, X_{N-2}, \ldots, X_{M+1}\}_2$, is applied to the inputs of the Booth encoders 202, 204, 206, 208. The next less significant bit of the Booth encoder 202 is taken from bit number M (i.e. $X_M$). Booth encoder 202 corresponds to the first row in Booth multiplier array 210. Note that this generated multiplier, and the correct assumed bit, can be created merely by connecting the inputs to the Booth encoders 202, 204, 206, 208 appropriately. No extra hardware or circuitry is necessary.

The configuration of Booth multiplier array 210 as an N–M array has been shown mainly for illustrative purposes. If a higher radix implementation were chosen, fewer rows would be necessary as each row would take action on a larger number of multiplier bits. In addition, many Booth multiplier arrays take advantage of the fact that the first row may have one or more unused inputs for each column. These extra inputs can be utilized to allow the first row to act on a larger number of multiplier bits. For example, each column, including the first column, of a Booth multiplier array is typically comprises a full-adder having an input for the multiplicand bit, the partial product bit, and a carry bit. However, since there is not partial product yet, the first row does not need a partial product input. With the appropriate encoding, this extra input can be used to do the shifting and adding that would normally be done by the second row of the Booth multiplier array. This is the preferred embodiment of the invention. Similarly, if the carry bit input is unused and the multiplication unsigned, an additional row may be combined into the first row with the appropriate encoding.

Each row of Booth multiplier array 210 operates to either shift the multiplicand and pass it and a partial product to the next row, add the multiplicand to a partial product and pass the resulting sum and a shifted multiplicand to the next row, or subtract the multiplcand from a partial product and pass the resulting difference and a shifted multiplicand to the next row. These three actions correspond to the actions taken in the description of Booth's algorithm, previously.

The action of each row of Booth multiplier array 210 is controlled by a Booth encoder 202, 204, 206, 208. There is one Booth encoder 202, 204, 206, 208 for each row in Booth multiplier array 210. The Booth encoders 202, 204, 206, 208 examine a bit of the multiplier, and the next less significant bit, and produce an output that controls a corresponding row of the Booth multiplier array 210 to take the appropriate action according to Booth's algorithm. For example, if Booth encoder 204 has a 1 on its bit input, and a 0 on its next less significant bit input, it would instruct the second row of the Booth multiplier array 210 to subtract the multiplicand it received from the previous row from the partial product it received from the previous row. It would then shift the multiplicand one bit to the left, then pass that and the result of the subtraction to the third row. This process is repeated by each row of the Booth multiplier array 210 and each Booth encoder 202, 204, 206, 208 until a result is produced by the last row in the Booth multiplier array. This result may then be adjusted to compensate for the removal of bits from the multiplier and the position of the radix point in the number to be squared. Since this adjustment is typically a left shift or a right shift, this adjustment can be done by connecting to outputs of the last row of the Booth multiplier array appropriately. No extras hardware or circuitry is necessary. However, if it is desired to generate approximate squares for numbers with different radix places, a shifter can be used to adjust the output of the Booth multiplier array.

The adjusted result of the method illustrated in FIG. 1 and the apparatus in FIG. 2 can be expressed as:

$$R = (X + (\Delta_1 - \Delta_2))(X - (\Delta_1 + \Delta_2)) = (X^2 - (\Delta_1 - \Delta_2)^2) \approx X^2$$

where $\Delta_1=\{0\ldots 0,X_M,0\ldots 0\}_2$ and $\Delta_2=\{0\ldots 0, X_{M-1},\ldots x_0\}_2$. This shows that smaller the bit number chosen for M, the smaller that $\Delta_1-\Delta_2$ will be and the better the generated approximate square. In contrast, the larger the bit number chosen for M, the faster the algorithm will execute. Likewise, the larger the bit number chosen for M translates into less space, less cost, and faster operation when the approximate square generation is done in hardware or on an integrated circuit.

One way to choose M relates to the number of significant binary digits in the input number, X. For example, take a number sampled by a 16-bit analog to digital converter that represents a value between zero and one. This could be represented as a 16-bit number with the radix point to the left of the most significant bit. Also, since this number has only sixteen bits of precision, then there are at most sixteen significant binary digits. When an exact square of this number is calculated, the result would be thirty-two bits long with the radix point still to the left of the most significant bit. However, because the result of the computation can be no more accurate than the least-accurate number in the data, at most sixteen of these bits are significant. The lower order sixteen bits should be rounded off. The present invention can take advantage of that fact by choosing M to be seven. If M is seven, then the maximum error in the approximate square can be expressed as:

$$E=(\Delta_{1-\Delta 2})^2=(\{0.0000000010000000\}_2-\{0.0000000000000000\}_2)^2$$
$$=(\{0.0000000010000000\}_2)^2$$
$$=\{0.00000000000000001000000000000000\}_2$$

Note that this maximum error, E, has sixteen leading zeroes in the most significant bit positions. This shows that the approximate square generated by the present invention with an M of seven has an error in this case that would only affect bits that are going to be discarded when the results are rounded of to sixteen significant binary bits. Accordingly, after the result is rounded off to sixteen significant binary bits, the method and apparatus of the present invention would produce a result that differs from a full multiplier producing an exact result by at most one least significant bit. The method and apparatus of the present invention, however, should operate faster and take a smaller amount of hardware resources.

Although several specific embodiments of the invention have been described and illustrated, the invention is not to be limited to the specific forms or arrangements of parts so described and illustrated. For example, FIG. 2 shows Booth encoders that examine only one bit and the bit preceding that bit. Other configurations of Booth encoders and Booth multiplier arrays, such as encoders that examine more bits per row and a corresponding Booth multiplier array, could be used. The invention is limited only by the claims.

What is claimed is:

1. A method of generating an approximate square of a binary number, comprising:

generating a multiplicand wherein said multiplicand is generated by removing at least a first bit from said binary number and shifting a second set of bits of said binary number;

generating a multiplier wherein said multiplier is generated by removing said at least first bit from said binary number and by removing said second set of bits from said binary number;

multiplying said multiplicand and said multiplier to produce a first result using Booth's algorithm, wherein Booth's algorithm has an assumed bit and said first bit is used as said assumed bit.

2. The method of claim 1, further comprising:
adjusting said first result by shifting said first result to produce a second result.

3. The method of claim 2 wherein said shifting said first result compensates for at least said removing of said second set of bits.

4. The method of claim 3 wherein said shifting said first result compensates for said removing of at least said first bit.

5. A method of generating an approximate square of a binary number, comprising:

selecting a first bit position in said binary number, said first bit position defining a first set of bits that are higher order bits than said first bit position and said first bit position defining a second set of bits that are lower order bits than said first bit position;

multiplying a multiplicand and a multiplier using Booth's algorithm to produce a first result, Booth's algorithm having an assumed bit, wherein said multiplicand is equivalent to said binary number with said first bit position zeroed summed with said second set of bits and wherein said multiplier consists of said first set of bits and wherein said assumed bit is taken from said first bit position of said binary number.

6. The method of claim 5, further comprising:
adjusting said first result by shifting said first result to produce a second result.

7. The method of claim 6 wherein said shifting said first result compensates said second set of bits not being in said multiplier.

8. The method of claim 7 wherein said shifting said first result also compensates for said first selected bit position not being part of said multiplier.

9. An apparatus for producing an approximate square of a binary number, comprising:

a partial Booth-encoded multiplier, said partial Booth-encoded multiplier multiplying a multiplicand and a multiplier, wherein said multiplicand is comprised of a first subset of bits of said binary number and said multiplier is comprised of a second subset of bits of said binary number, and wherein said partial Booth-encoded multiplier has an assumed bit and said assumed bit is taken from a third subset of bits of said binary number that is not in said multiplier and not in said multiplicand.

10. The apparatus of claim 9 wherein said binary number is comprised of N number of bits and said third subset of bits is composed of the Mth numbered bit of said binary number, wherein said numbering begins at zero with the least significant bit of said binary number and continues in order to the N−1 numbered bit, the N−1 number bit being the highest order bit of said binary number.

11. The apparatus of claim 10 wherein said partial Booth-encoded multiplier is a radix-2 implementation and has approximately (N/2)−M−1 rows.

12. The apparatus of claim 10 wherein said partial Booth-encoded multiplier is a radix-3 implementation and has approximately (N/3)−M−1 rows.

13. The apparatus of claim 10 wherein said partial Booth-encoded multiplier has a set of N multiplicand bit inputs and a set of N−M multiplier bit inputs and one assumed bit input.

14. An apparatus for producing an approximate square of a binary number, comprising:

a partial Booth-encoded multiplier comprised of N columns, wherein N is the number of bits in said binary number and M is a selected bit number less than N, and wherein said partial Booth-encoded multiplier has a set of N multiplicand bit inputs and wherein said partial Booth-encoded multiplier has a set of N−M multiplier bit inputs, and wherein all but the M numbered bit of said binary number is applied to said set of N multiplicand bit inputs.

15. The apparatus of claim 14 wherein the N−M highest order bits of said binary number are applied to said N−M highest order multiplier bit inputs.

16. The apparatus of claim 15 wherein the lowest order bit of said multiplier bit inputs is connected to a booth encoder having a −1 bit input, said −1 bit input of said booth encoder being received from the Mth numbered bit of said binary number.

17. The apparatus of claim 16 wherein said partial Booth-encoded multiplier is a radix-2 implementation.

18. The apparatus of claim 16 wherein said partial Booth-encoded multiplier is a radix-3 implementation.

* * * * *